(12) United States Patent
Nakano

(10) Patent No.: US 8,368,948 B2
(45) Date of Patent: Feb. 5, 2013

(54) IMAGE FORMING APPARATUS, METHOD, AND PROGRAM FOR EXECUTING SUPER-RESOLUTION PROCESSING BY DELETING SELECTED IMAGE DATA BASED ON A SPATIAL FREQUENCY CHARACTERISTIC OR COLOR

(75) Inventor: Toshimitsu Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 852 days.

(21) Appl. No.: 12/411,305

(22) Filed: Mar. 25, 2009

(65) Prior Publication Data

US 2009/0262371 A1    Oct. 22, 2009

(30) Foreign Application Priority Data

Apr. 18, 2008 (JP) ................................. 2008-109543

(51) Int. Cl.
*G06K 15/02* (2006.01)
*G06T 3/40* (2006.01)
*H04N 1/393* (2006.01)

(52) U.S. Cl. ........ 358/1.2; 358/3.27; 358/1.16; 358/451

(58) Field of Classification Search .................. 358/1.2, 358/1.9, 3.24, 3.27, 1.16, 501, 524, 525, 358/528, 532, 401, 404, 444, 447, 448, 451; 382/298–300

See application file for complete search history.

(56) References Cited

U.S. PATENT DOCUMENTS

| | | | |
|---|---|---|---|
| 4,656,524 A * | 4/1987 | Norris et al. .................. 358/401 |
| 5,282,057 A * | 1/1994 | Mailloux et al. .............. 358/451 |
| 5,767,987 A | 6/1998 | Wolff et al. |
| 5,917,963 A * | 6/1999 | Miyake .......................... 382/300 |
| 6,009,213 A * | 12/1999 | Miyake .......................... 382/300 |
| 6,944,357 B2 * | 9/2005 | Bossut et al. .................. 382/298 |
| 7,602,997 B2 * | 10/2009 | Young ............................ 382/299 |
| 7,830,369 B2 * | 11/2010 | Kageyama et al. ........... 345/204 |
| 7,856,154 B2 * | 12/2010 | Young ............................ 382/299 |
| 7,940,282 B2 * | 5/2011 | Milanfar et al. .............. 358/525 |
| 2005/0190409 A1 * | 9/2005 | Fujimori ....................... 358/1.2 |

FOREIGN PATENT DOCUMENTS

| | | |
|---|---|---|
| JP | 8098009 | 4/1996 |
| JP | 2008-124625 A | 5/2008 |

OTHER PUBLICATIONS

"Super Resolution Processing by Plural Number of Lower Resolution Images", Ricoh Technical Report, No. 24, Nov. 1998, pp. 19-25.
Japanese Office Action dated Feb. 6, 2012, concerning Japanese Patent Application No. 2008-109543.

* cited by examiner

*Primary Examiner* — Scott A Rogers
(74) *Attorney, Agent, or Firm* — Fitzpatrick, Cella, Harper & Scinto

(57) ABSTRACT

When executing super-resolution processing, both reduction in necessary memory capacity and generation of high-resolution image data having a desired image quality are achieved. This invention provides an image forming method in an image forming apparatus capable of executing super-resolution processing using a plurality of low-resolution image data to generate high-resolution image data. The method includes steps of acquiring a plurality of low-resolution image data, selecting image data to be deleted from the plurality of acquired image data on the basis of spatial frequency information or color information of each image data, deleting the selected image data, and storing, as image data used in the super-resolution processing, remaining image data which are not deleted among the plurality of image data.

5 Claims, 17 Drawing Sheets

IMAGE FORMING APPARATUS, METHOD, AND PROGRAM FOR EXECUTING SUPER-RESOLUTION PROCESSING BY DELETING SELECTED IMAGE DATA BASED ON A SPATIAL FREQUENCY CHARACTERISTIC OR COLOR

BACKGROUND OF THE INVENTION

1. Field of the Invention

The present invention relates to an image forming apparatus and image forming method and, more particularly, to an image forming technique in an image forming apparatus which performs super-resolution processing.

2. Description of the Related Art

There is known a super-resolution processing technique of performing data interpolation processing for a plurality of low-resolution image data having different phases to generate high-resolution image data (see, e.g., Ricoh Technical Report No. 24, November 1998).

There is also known a system which reads low-resolution image data whose phase is changed by adding an offset value to a scanner, and generates high-resolution image data by a super-resolution processing technique (see, e.g., Japanese Patent Laid-Open No. 8-98009).

However, the super-resolution processing requires a plurality of low-resolution image data. To execute this processing, an image forming apparatus having a memory capacity large enough to hold these low-resolution image data needs to be used.

The memory capacity may be reduced by decreasing the number of low-resolution image data used in super-resolution processing. In this case, high-resolution image data generated by super-resolution processing may not satisfy a desired image quality depending on low-resolution image data to be reduced.

SUMMARY OF THE INVENTION

The present invention has been made to overcome the conventional drawbacks.

An image forming apparatus according to the present invention comprises the following arrangement.

That is, an image forming apparatus which executes super-resolution processing using a plurality of image data having a first resolution to generate image data having a second resolution higher than the first resolution, the apparatus comprises: an acquisition unit configured to acquire a plurality of image data having the first resolution; a selection unit configured to select image data to be deleted from the plurality of image data acquired by the acquisition unit on the basis of one of spatial frequency information and color information of each image data; a deletion unit configured to delete the image data selected by the selection unit from the plurality of image data acquired by the acquisition unit; and a storage unit configured to store, as image data used in the super-resolution processing, remaining image data which are not deleted by the deletion unit among the plurality of image data acquired by the acquisition unit.

An image forming method according to the present invention comprises the following steps.

That is, an image forming method being for application to an image forming apparatus which executes super-resolution processing using a plurality of image data having a first resolution to generate image data having a second resolution higher than the first resolution, the method comprises: an acquisition step of acquiring a plurality of image data having the first resolution; a selection step of selecting image data to be deleted from the plurality of image data acquired in the acquisition step on the basis of spatial frequency information or color information of each image data; a deletion step of deleting the image data selected in the selection step from the plurality of image data acquired in the acquisition step; and a storage step of storing, as image data used in the super-resolution processing, remaining image data which are not deleted in the deletion step among the plurality of image data acquired in the acquisition step.

The present invention can achieve both reduction in necessary memory capacity and generation of high-resolution image data having a desired image quality when executing super-resolution processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings.

First Embodiment

<1. Configuration of Printing System>

Figure 1:
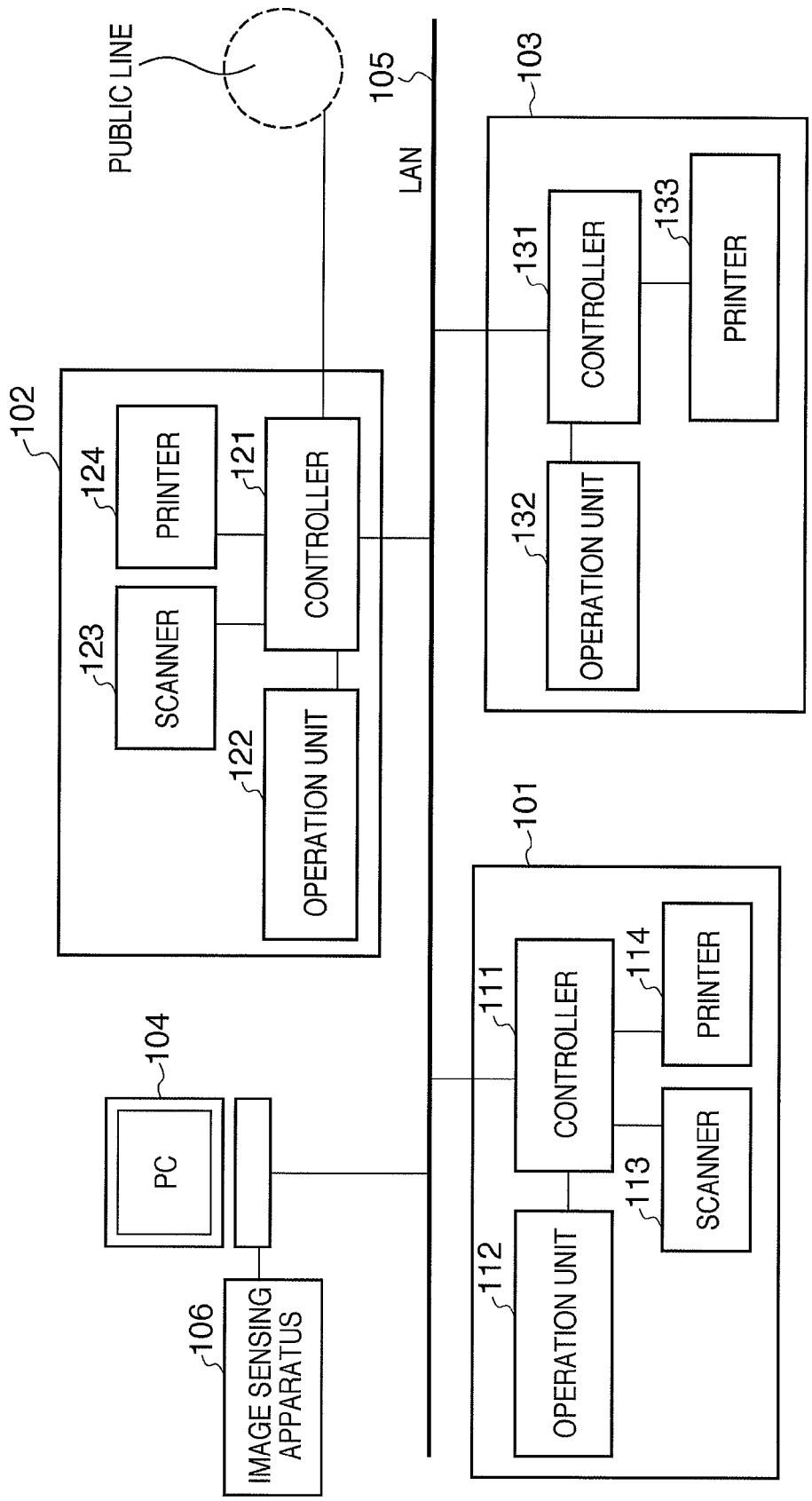
FIG. 1 is a block diagram showing the configuration of a printing system having an image forming apparatus.

FIG. 1 is a block diagram showing the configuration of a printing system having an image forming apparatus according to the first embodiment. In FIG. 1, one host computer (a host computer 104) and three image forming apparatuses (image forming apparatuses 101 to 103) are connected via a LAN 105. However, the configuration of the printing system is not limited to this.

In FIG. 1, the respective apparatuses 101 to 104 are connected via the LAN 105, but the connection method is not limited to this. For example, the respective apparatuses 101 to 104 may also be connected using an arbitrary network (e.g., WAN (public line)), a serial transmission method (e.g., USB), a parallel transmission method (e.g., Centronics interface or SCSI), or the like.

The host computer (to be referred to as a PC hereinafter) 104 has personal computer functions. The PC 104 can transmit/receive files and e-mail via the LAN 105 on the basis of the FTP or SMB protocol.

The PC 104 can receive image data from an image sensing apparatus 106 such as a digital camera or video camera, and transmit image data to the image forming apparatuses 101 to 103. The PC 104 can also output a print instruction to the image forming apparatuses 101 to 103 via a printer driver.

Each of the image forming apparatuses 101 and 102 includes a scanner and printer. In contrast, the image forming apparatus 103 includes a printer, but does not include a scanner. However, the image forming apparatuses have the same basic arrangement, so the arrangement of the image forming apparatus 101 will be explained in detail for descriptive convenience.

The image forming apparatus 101 includes a scanner 113 serving as an image input device, and a printer 114 serving as an image output device. The image forming apparatus 101 also includes a controller 111 which controls the overall operation of the image forming apparatus 101, and an operation unit 112 serving as a user interface (UI). The arrangement of each unit of the image forming apparatus 101 will be explained.

<2. Details of Scanner 113 and Printer 114>

Figure 2:
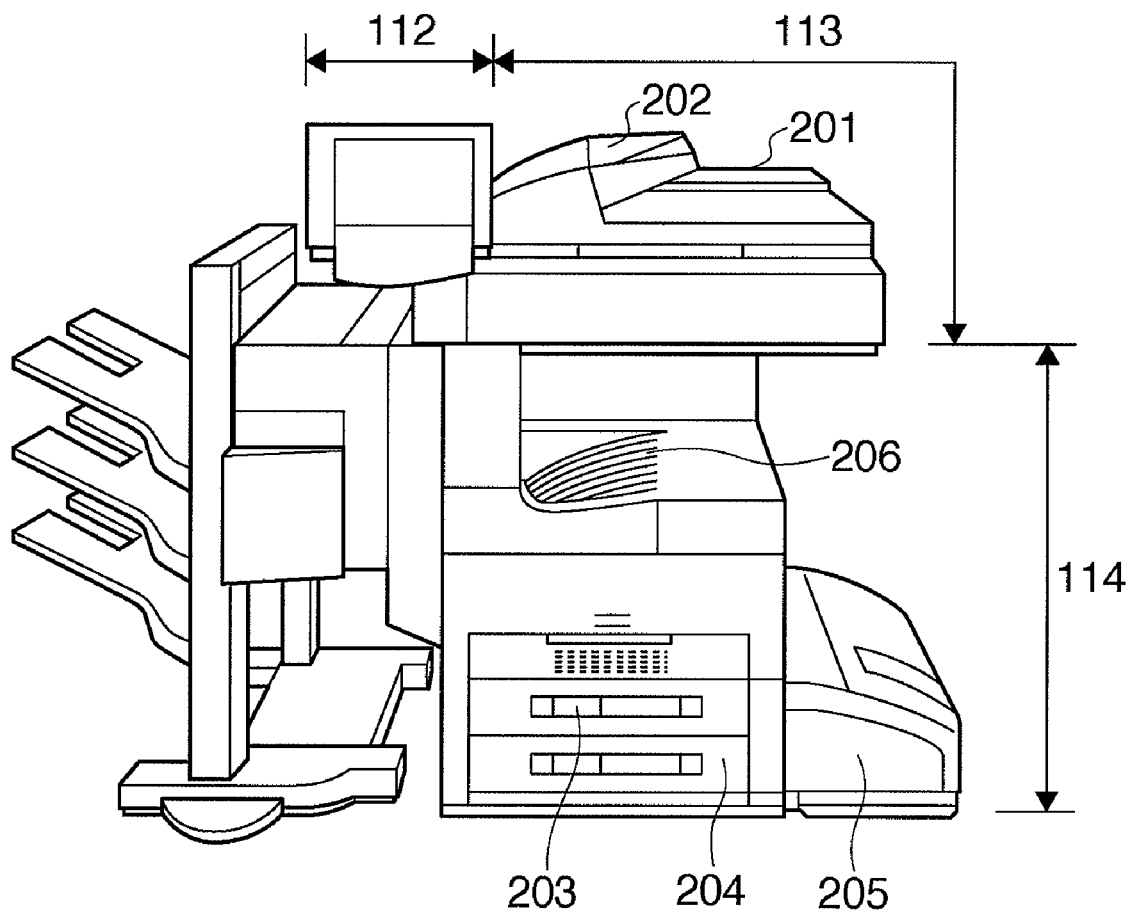
FIG. 2 is a view showing the outer appearance of an image forming apparatus 101.

FIG. 2 is a view showing the outer appearance of the image forming apparatus 101. The functional arrangements of the scanner 113 and printer 114 of the image forming apparatus 101 will be explained with reference to FIG. 2.

The scanner 113 converts document image information into an electrical signal by guiding, to a CCD, reflected light obtained by exposing and scanning a document image on a document table. Further, the scanner 113 converts the electrical signal into R, G, and B luminance signals, and outputs the luminance signals as image data to the controller 111.

Document sheets are set on a tray 202 of a document feeder 201. When the user inputs a reading start instruction via the operation unit 112, the controller 111 transmits a document reading instruction to the scanner 113.

Upon receiving the document reading instruction, the scanner 113 feeds document sheets one by one from the tray 202 of the document feeder 201, and performs a document reading operation. The document reading method is not limited to the automatic feeding method by the document feeder 201. A document sheet may also be scanned by setting it on a glass surface (not shown) and moving the exposure unit.

The printer 114 is an image forming device which forms an image on a print sheet on the basis of image data received from the controller 111. The printer 114 includes a plurality of paper cassettes 203, 204, and 205 which allow selection of sheets of different sizes or different orientations. A sheet bearing an image is discharged to a delivery tray 206.

<3. Details of Controller 111>

Figure 3:
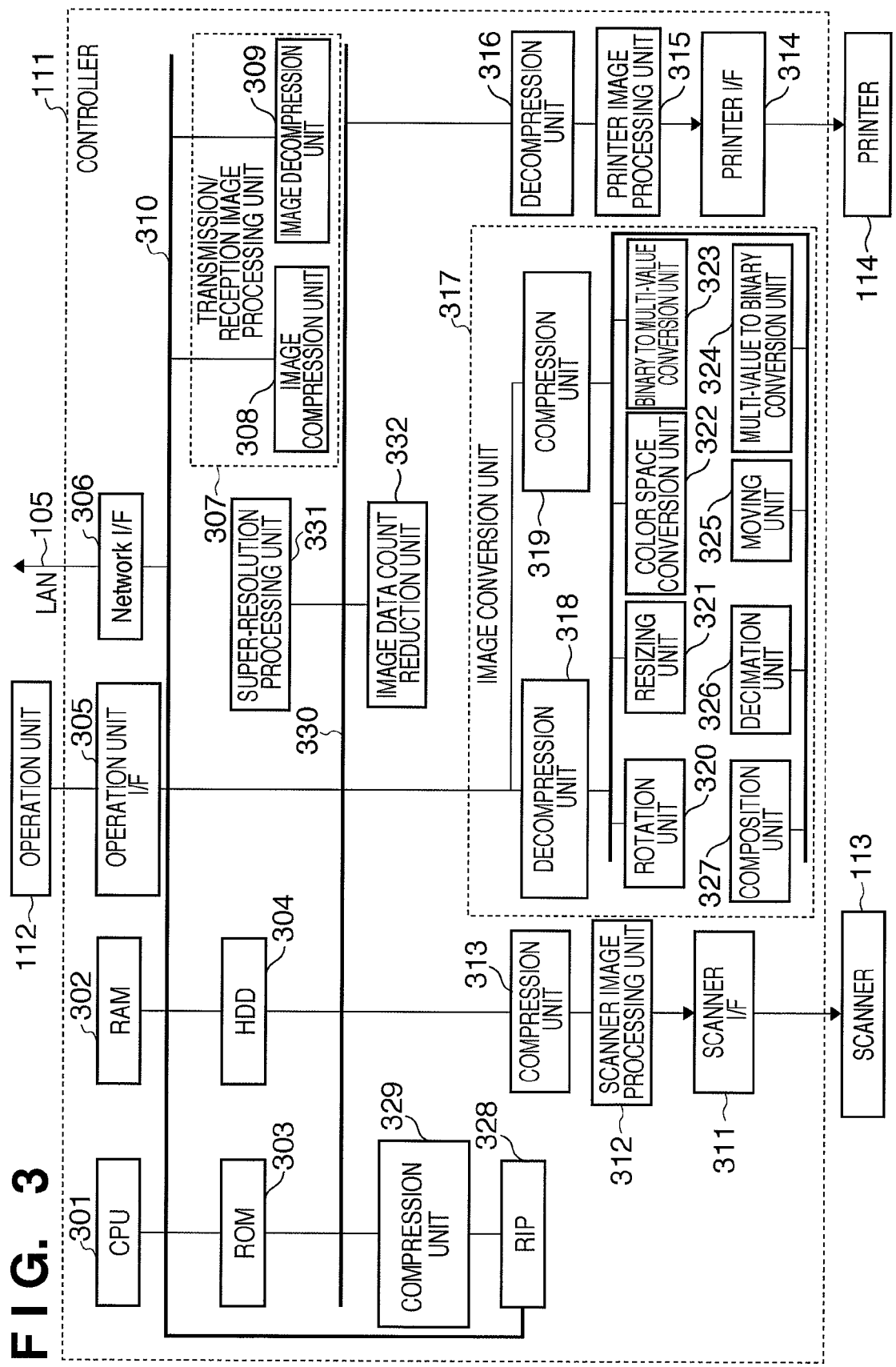
FIG. 3 is a block diagram showing the functional arrangement of a controller 111 of the image forming apparatus 101.

FIG. 3 is a block diagram showing the functional arrangement of the controller 111 of the image forming apparatus 101. Details of the functions of the controller 111 will be explained with reference to FIG. 3.

The controller 111 is electrically connected to the scanner 113 and printer 114. The controller 111 is also connected to the PC 104, another image processing apparatus, and the like via the LAN 105 so as to be able to communicate with them. This arrangement makes it possible to input/output various kinds of information such as image data and device information.

In FIG. 3, a CPU 301 comprehensively controls accesses to respective units on the basis of control programs and the like stored in a ROM 303. In addition, the CPU 301 comprehensively controls various processes executed in the controller 111.

A RAM 302 is a system work memory for operating the CPU 301, and is a memory for temporarily storing image data. The RAM 302 is formed from an SRAM which holds stored contents even upon power-off, and a DRAM which erases stored contents upon power-off.

The ROM 303 is a memory which stores the boot program of the image forming apparatus 101 and the like. An HDD (Hard Disk Drive) 304 stores system software and image data.

An operation unit I/F 305 is an interface for connecting the system bus 310 and operation unit 112. The operation unit I/F 305 receives, from a system bus 310, image data to be displayed on the operation unit 112, and outputs it to the operation unit 112. Also, the operation unit I/F 305 outputs, to the system bus 310, information input from the operation unit 112.

A Network I/F 306 is an interface which connects the controller 111 to the LAN 105 and system bus 310, and transmits/receives various kinds of information such as image data and device information.

A transmission/reception image processing unit 307 includes an image decompression unit 309 and image compression unit 308. The image decompression unit 309 receives and decompresses compressed image data. The image compression unit 308 compresses image data before transmission into a size suitable for transmission to the LAN 105. An image bus 330 is a transmission line for exchanging image data, and is formed from a PCI bus or IEEE1394 bus.

A scanner image processing unit 312 performs processes such as correction, manipulation, and editing for image data received from the scanner 113 via a scanner I/F 311. The scanner image processing unit 312 determines whether received image data represents a color or monochrome document, or a text or photographic document. The scanner image processing unit 312 adds the determination result to the image data. The additional information added to image data is called attribute data.

A compression unit 313 receives and compresses image data. A decompression unit 316 decompresses compressed image data, rasterizes the decompressed image data, and sends the rasterized image data to a printer image processing unit 315.

The printer image processing unit 315 receives image data sent from the decompression unit 316, and performs image processing for the image data while referring to attribute data added to the received image data. The image data having undergone the image processing is output to the printer 114 via a printer I/F 314. Details of processing executed in the printer image processing unit 315 will be described later.

An image conversion unit 317 performs predetermined conversion processing for image data. The image conversion unit 317 is formed from processing units which perform the following processes.

A decompression unit 318 decompresses received image data. A compression unit 319 compresses received image data. A rotation unit 320 rotates received image data. A resizing unit 321 performs resolution conversion processing (e.g., conversion processing from 600 dpi to 200 dpi) for received image data.

A color space conversion unit 322 converts the color space of received image data. The color space conversion unit 322 can execute known undercolor removal processing using a matrix or table, known Log transformation processing (RGB→CMY), and known output color correction processing (CMY→CMYK).

A binary to multi-value conversion unit 323 converts received image data of two tone levels into image data of 256 tone levels. A multi-value to binary conversion unit 324 converts received image data of 256 tone levels into image data of two tone levels by error diffusion processing or the like.

A composition unit 327 composites two received image data to generate one image data. When compositing two image data, the average of the luminance values of pixels to be composited is used as a composite luminance value, or the luminance value of a pixel of higher luminance level is used as a composite luminance value. Alternatively, the luminance value of a pixel of lower luminance level is used as a composite luminance value. Alternatively, a value obtained by ORing, ANDing, or exclusive-ORing the luminance values of pixels to be composited is used as a composite luminance value. All these composition methods are well-known methods, and a description thereof will be omitted.

A decimation unit 326 decimates pixels of received image data at a decimation ratio of ½, ¼, ⅛, or the like to convert the resolution and generate image data. A moving unit 325 adds a margin to received image data or deletes a margin from image data.

A RIP 328 receives intermediate data generated based on PDL code data transmitted from the PC 104, and generates bitmap data (multi-value data).

A super-resolution processing unit 331 generates high-resolution image data from a plurality of image data of low resolution (first resolution) received from the scanner 113, LAN 105, or the like, or read out from the HDD 304.

An image data count reduction unit 332 deletes low-resolution image data used in super-resolution processing on the basis of conditions. Details of the super-resolution processing unit 331 and image data count reduction unit 332 will be described later.

<4. Detailed Description of Printer Image Processing Unit 315>

Figure 4:
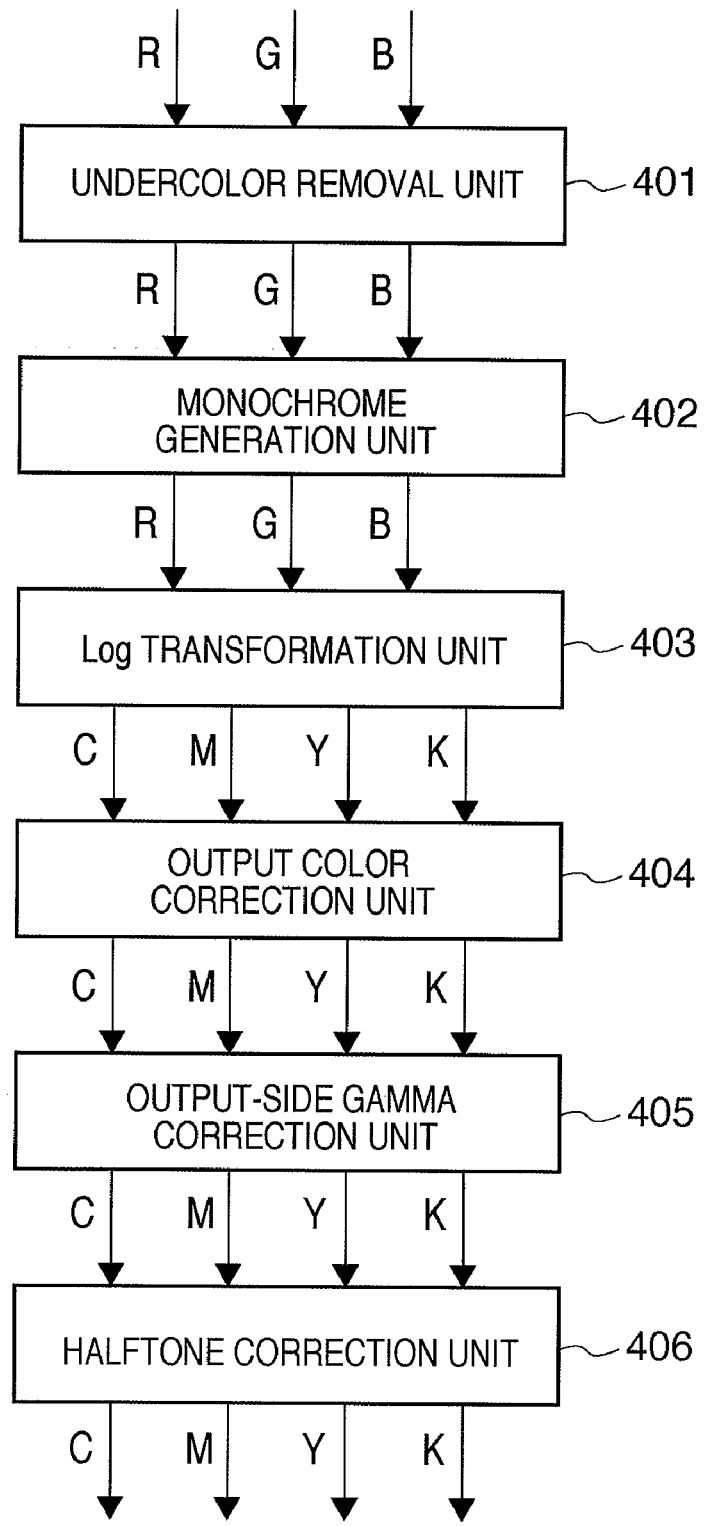
FIG. 4 is a block diagram showing processing contents in a printer image processing unit 315.

FIG. 4 is a block diagram showing processing contents in the printer image processing unit 315. Details of processing in the printer image processing unit 315 will be explained with reference to FIG. 4.

An undercolor removal unit 401 removes the undercolor of image data. A monochrome generation unit 402 converts color data into monochrome data.

A Log transformation unit 403 performs luminance-to-density conversion. For example, the Log transformation unit 403 converts input R, G, and B image data into C, M, and Y image data.

An output color correction unit 404 performs output color correction. For example, the output color correction unit 404 converts input C, M, and Y image data into C, M, Y, and K image data using a table or matrix.

An output-side gamma correction unit 405 performs correction so that a signal value input to the output-side gamma correction unit 405 and a reflection density value after print-out become proportional to each other. A halftone correction unit 406 performs halftone processing in accordance with the number of tone levels of the printer for output. For example, the halftone correction unit 406 converts received image data of a large number of tone levels into image data of 2 or 32 tone levels.

<5. Detailed Description of Super-Resolution Processing Unit 331>

Figure 5:
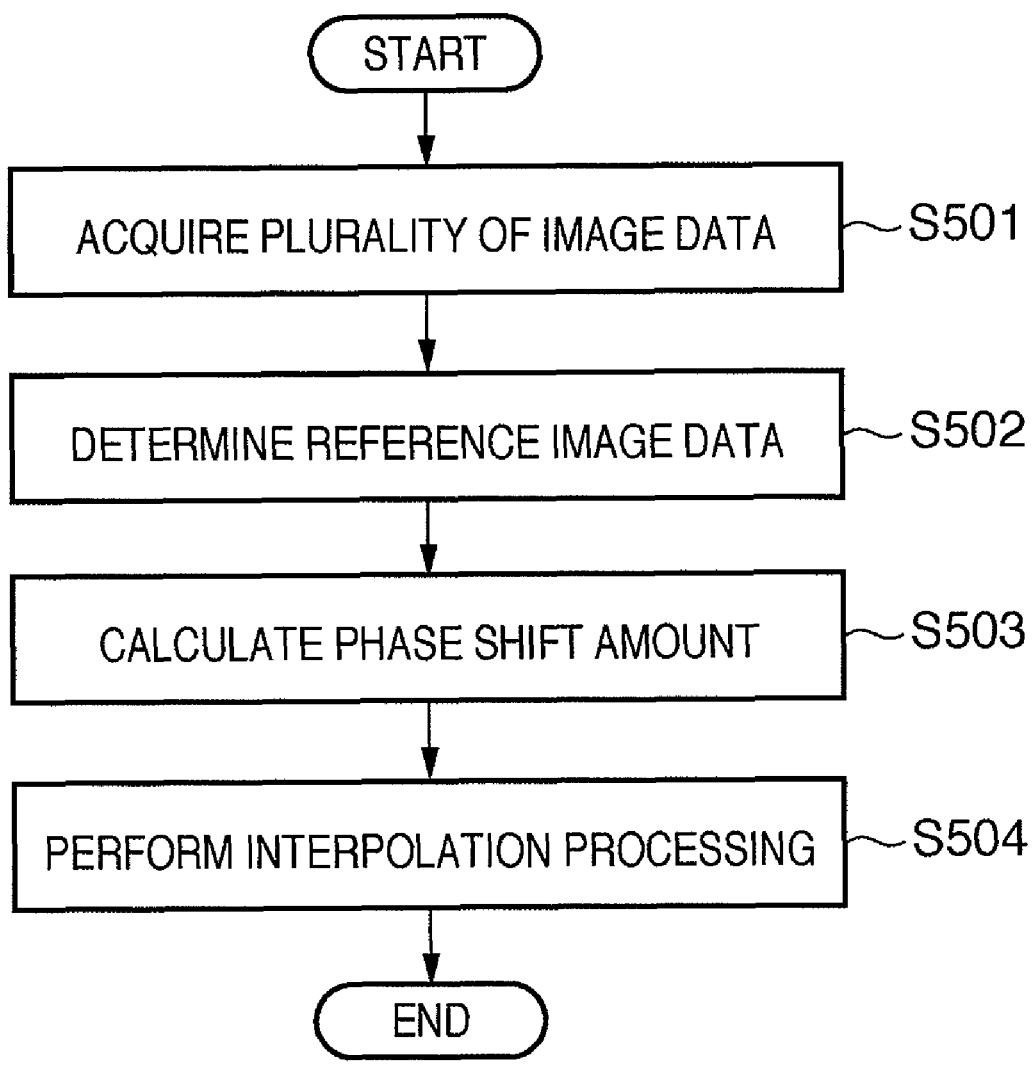
FIG. 5 is a flowchart showing the sequence of processing in a super-resolution processing unit 331.

Details of processing in the super-resolution processing unit 331 will be explained with reference to FIGS. 5 to 7. FIG. 5 is a flowchart showing the sequence of processing in the super-resolution processing unit 331.

In step S501, the super-resolution processing unit 331 acquires a plurality of low-resolution image data used in super-resolution processing. The plurality of low-resolution image data are acquired from the scanner 113 or LAN 105. Alternatively, the plurality of low-resolution image data are acquired by reading them out from the HDD 304. An image sensed by the image sensing apparatus 106 may also be acquired via the LAN 105, or directly stored in the HDD 304 via a memory device such as a USB memory or SD memory card.

In step S502, the super-resolution processing unit 331 determines image data (reference image data) serving as a reference for calculating the phase shift amount of each image data.

In step S503, the super-resolution processing unit 331 calculates the phase shift amount between the reference image data and each of the image data. In step S504, the super-resolution processing unit 331 performs interpolation processing using the pixel values of respective image data at the same pixel and the phase shift amount, thereby calculating the pixel value between adjacent pixels and generating image data of high resolution (second resolution).

Figure 6:
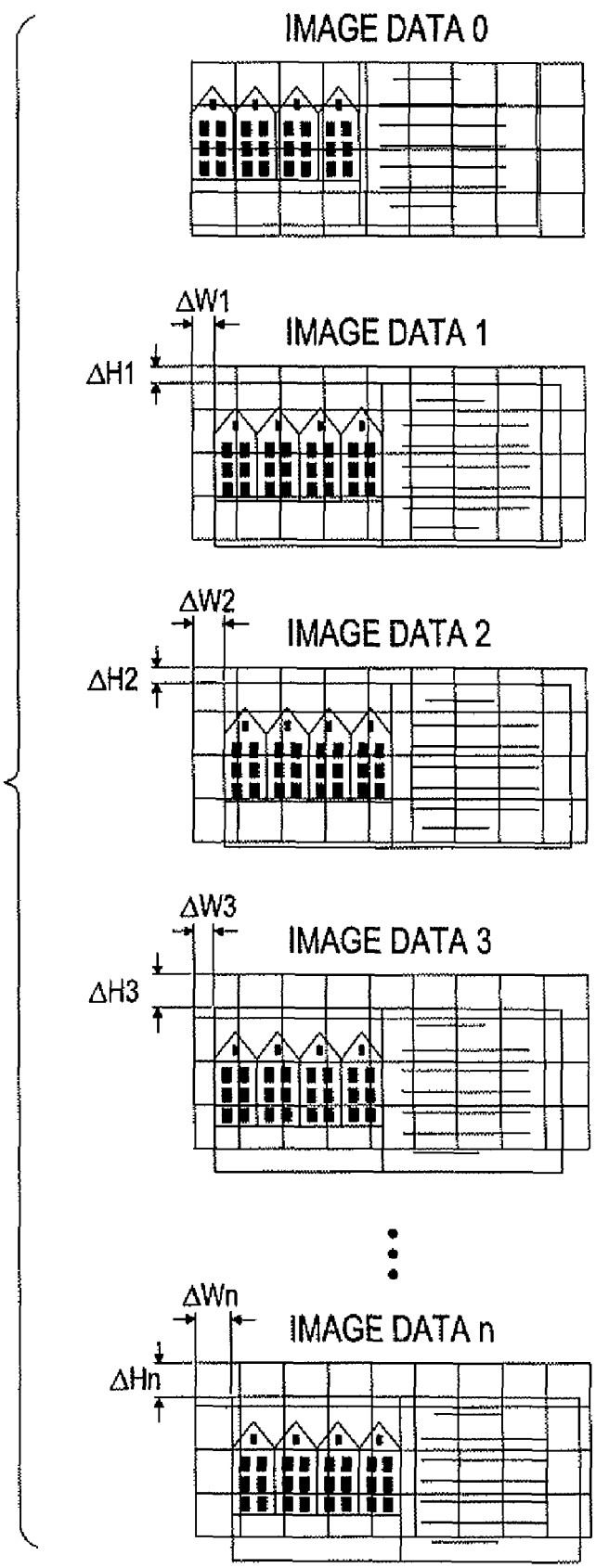
FIG. 6 is a view showing the phase shift amount of low-resolution image data.

FIG. 6 is a view showing the phase shift amount of low-resolution image data. In FIG. 6, image data 0 serves as reference image. Each lattice line is an auxiliary line for expressing a phase shift, and each square corresponds to one pixel.

Image data 0 is reference image data, so the phase shift is 0 in both the longitudinal and lateral directions.

The phase shift amount of each of image data is less than one pixel. The phase shift amounts (in the lateral and longitudinal directions) of image data 1, 2, 3, ..., n are $(\Delta W_1, \Delta H_1)$, $(\Delta W_2, \Delta H_2)$, $(\Delta W_3, \Delta H_3)$, ..., $(\Delta W_n, \Delta H_n)$.

To generate high-resolution image data from low-resolution image data, new pixels need to be generated between the pixels of low-resolution image data. For example, in order to generate image data at a double resolution, 12 pixels are generated to convert 2×2 low-resolution pixels are converted into 4×4 high-resolution pixels.

At this time, the values of newly generated pixels are generated by interpolation processing using the pixel values of image data 0 to n and the calculated phase shift amounts $(\Delta W_1, \Delta H_1), \ldots, (\Delta W_n, \Delta H_n)$. As the interpolation processing, a known interpolation processing method such as bilinear interpolation is employed.

Figure 7:
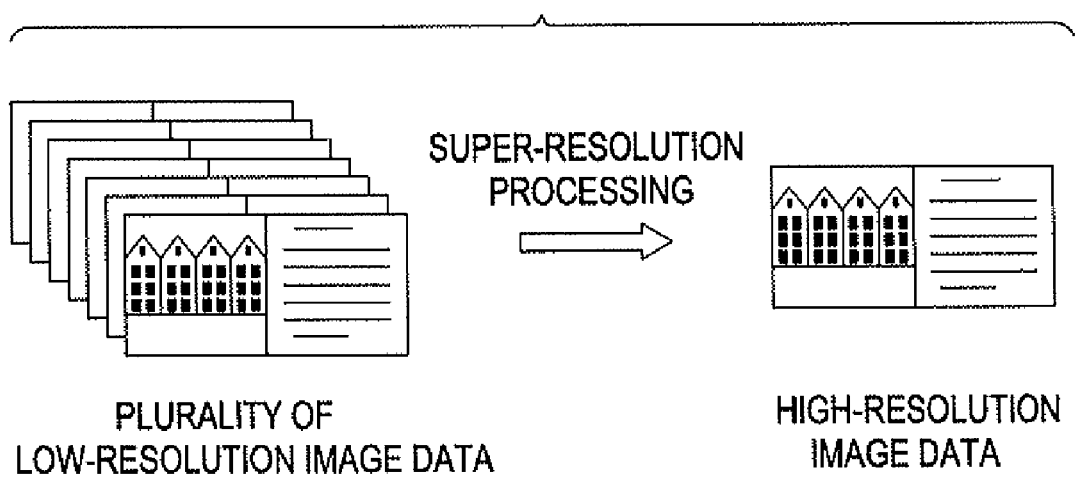
FIG. 7 is a view showing a state in which high-resolution image data is generated from a plurality of low-resolution image data by super-resolution processing.

FIG. 7 shows a state in which high-resolution image data is generated from a plurality of low-resolution image data by super-resolution processing.

<6. Detailed Description of Image Data Count Reduction Unit 332>

Details of processing in the image data count reduction unit 332 will be explained with reference to FIGS. 8 to 13.

Figure 8:
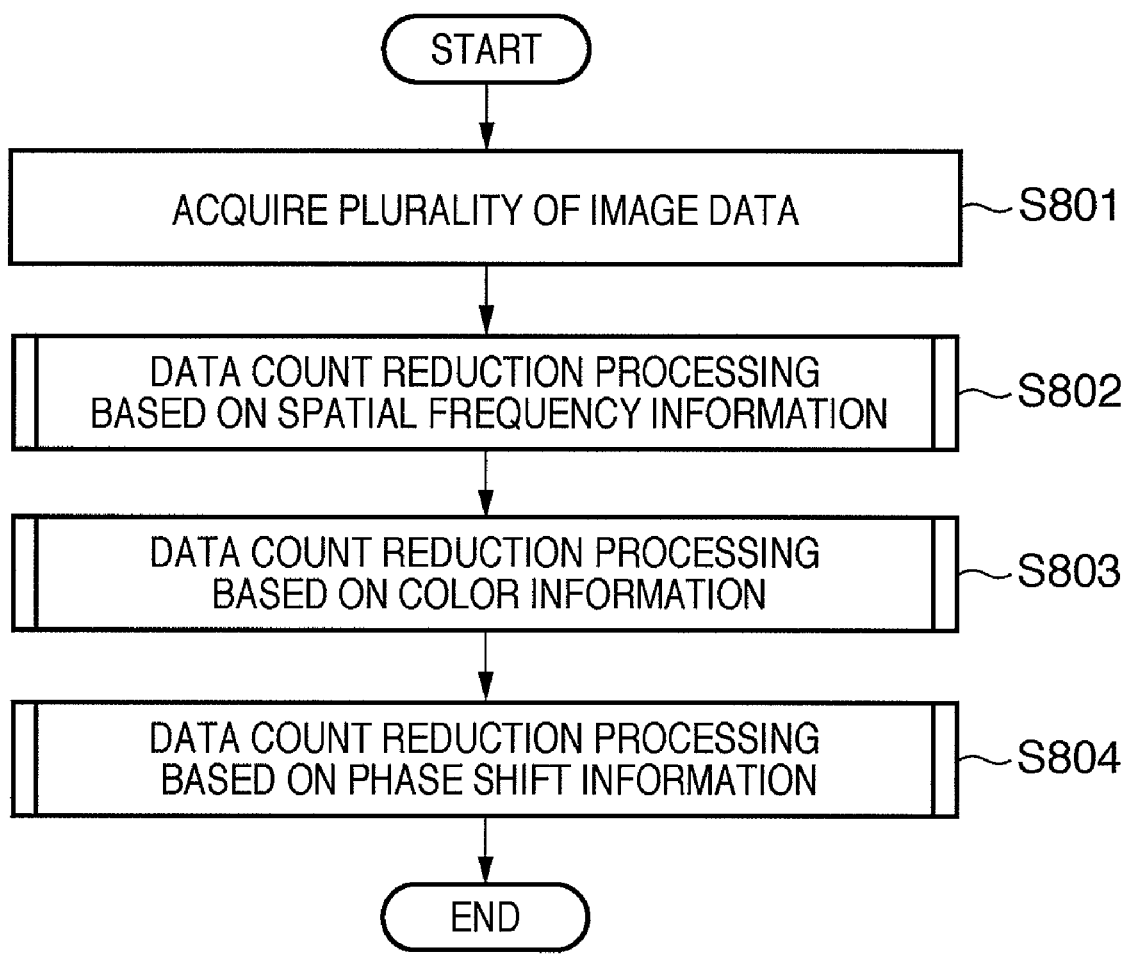
FIG. 8 is a flowchart showing the sequence of image data count reduction processing in an image data count reduction unit 332.

FIG. 8 is a flowchart showing the sequence of image data count reduction processing in the image data count reduction unit 332.

In step S801, the image data count reduction unit 332 receives a plurality of low-resolution image data used in super-resolution processing. In step S802, the image data count reduction unit 332 reduces the number of image data on the basis of spatial frequency information of each image data.

In step S803, the image data count reduction unit 332 reduces the number of image data on the basis of color information of each image data. In step S804, the image data count reduction unit 332 reduces the number of image data on the basis of phase shift amount information of each image data.

The image data count reduction processes in steps S802 to S804 will be explained.

<6.1 Image Data Count Reduction Processing Based on Spatial Frequency Information>

Figure 9:
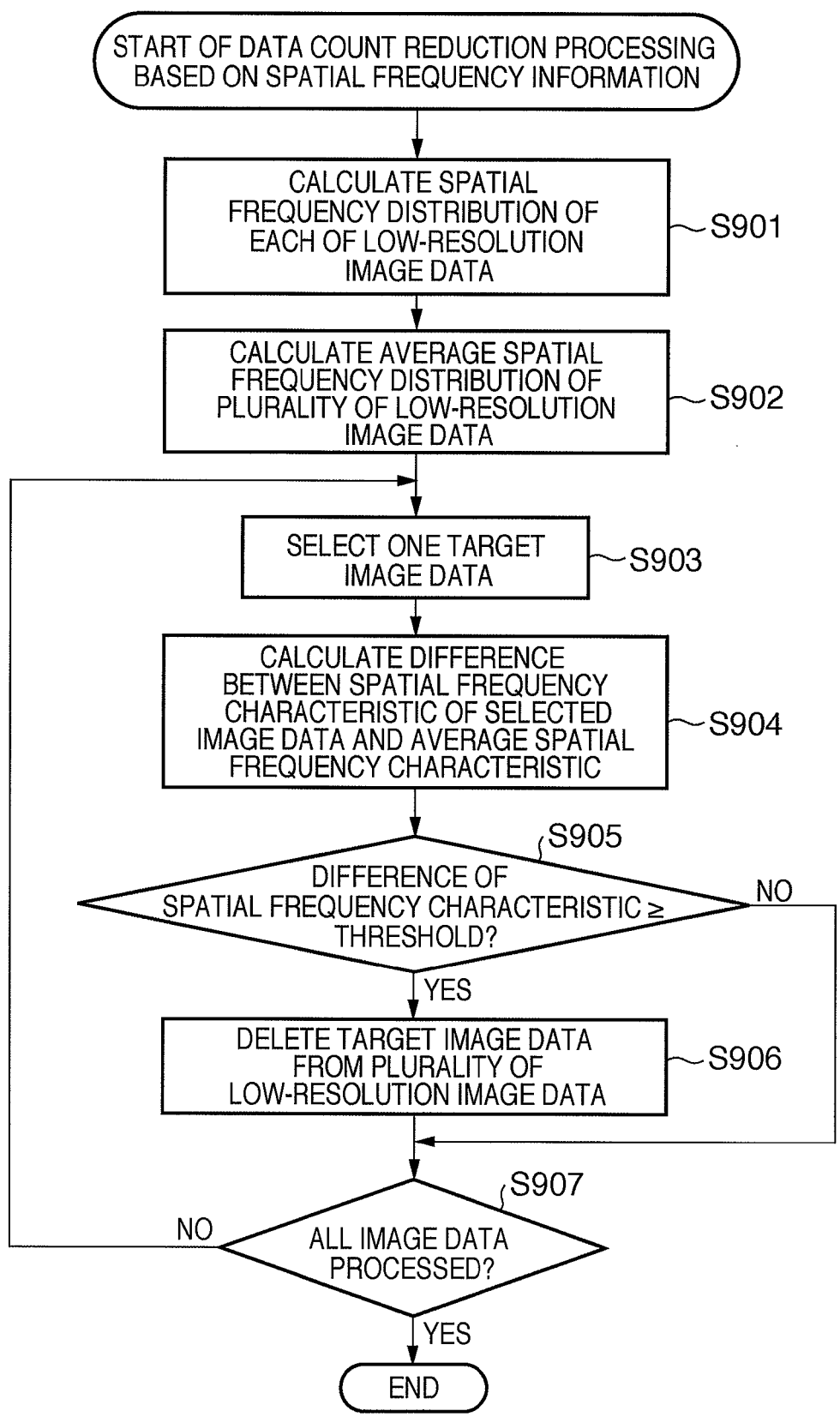
FIG. 9 is a flowchart showing the sequence of image data count reduction processing based on spatial frequency information.

FIG. 9 is a flowchart showing the sequence of image data count reduction processing based on spatial frequency information.

In step S901, the image data count reduction unit 332 calculates the spatial frequency distribution of each of low-resolution image data. In step S902, the image data count reduction unit 332 calculates the average spatial frequency distribution of the plurality of image data.

In step S903, the image data count reduction unit 332 selects one target image data from the plurality of image data. In step S904, the image data count reduction unit 332 calculates the difference between the spatial frequency distribution of the target image data and the average spatial frequency distribution calculated in step S902.

In step S905, the image data count reduction unit 332 determines whether the difference from the calculated spatial frequency distribution is equal to or larger than a predetermined threshold. If the image data count reduction unit 332 determines that the difference is equal to or larger than the threshold (determines that the spatial frequency characteristic is different), the process advances to step S906.

In step S906, the image data count reduction unit 332 determines that the target image data has a characteristic different from those of the remaining image data, and deletes the target image data from the plurality of image data.

In step S907, the image data count reduction unit 332 determines whether all the image data have been processed. If the image data count reduction unit 332 determines that unprocessed image data remains, the process returns to step S903 to perform steps S904 to S907 for the next target image data.

If the image data count reduction unit 332 determines in step S905 that the difference from the calculated spatial frequency distribution is smaller than the threshold, it determines that the image data has a similar characteristic, and the process advances to step S907 without deleting the target image data.

If the image data count reduction unit 332 determines in step S907 that all the image data have been processed, it ends the image data count reduction processing based on spatial frequency information.

Figure 10:
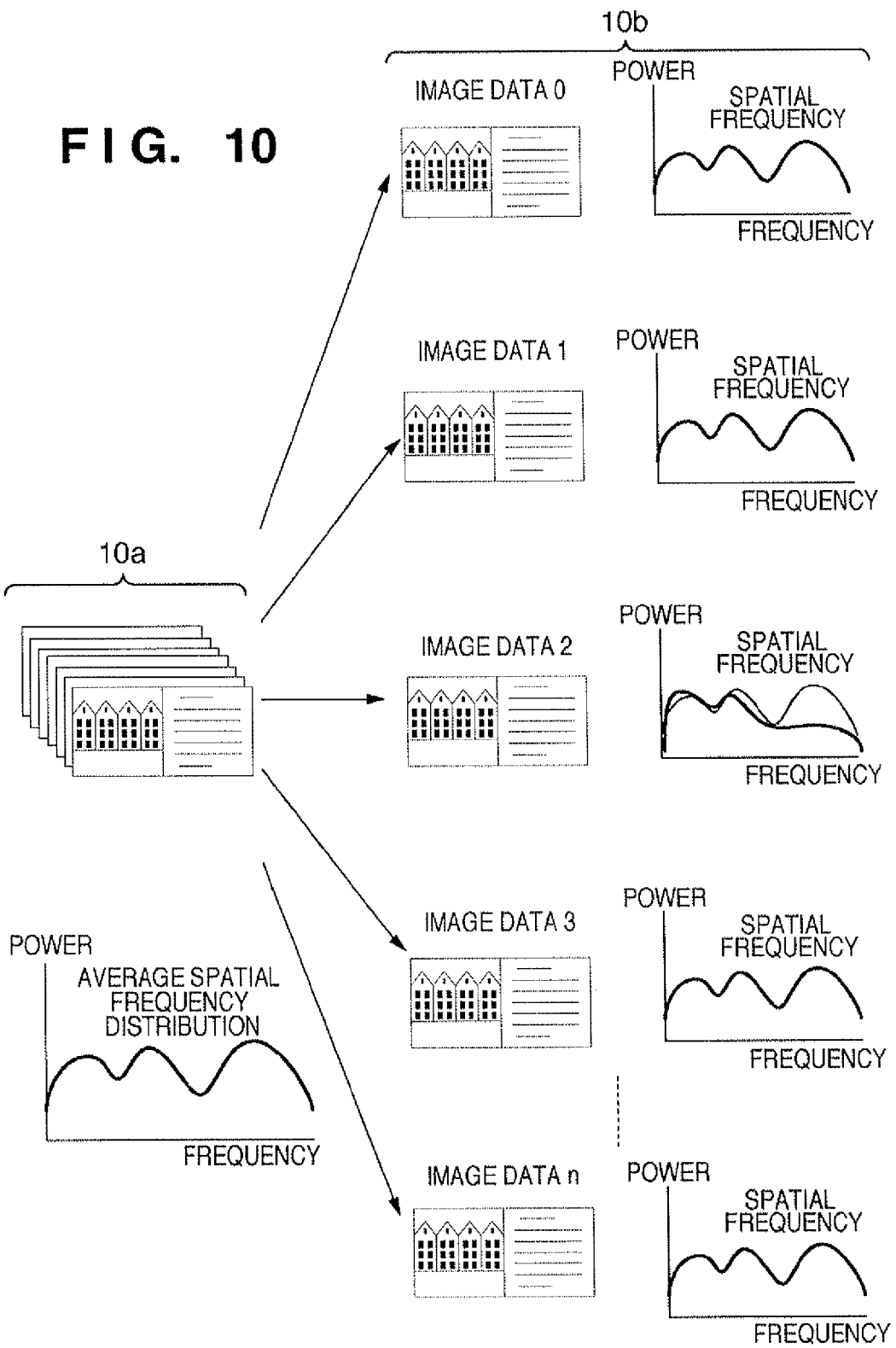
FIG. 10 is a view showing an example of the characteristic of the spatial frequency distribution of each image data.

FIG. 10 is a view showing an example of the characteristic of the spatial frequency distribution of each image data. In FIG. 10, 10a represents a plurality of image data and their average spatial frequency distribution.

In FIG. 10, 10b represents respective image data (0 to n) and their spatial frequency distributions. Each image data in super-resolution processing has a phase shift of one pixel or less. The spatial frequency distribution of each image data is almost the same as the average spatial frequency distribution represented in 10a of FIG. 10.

The spatial frequency distributions of image data 0 to n except image data 2 in 10b of FIG. 10 are almost the same as the average spatial frequency distribution, and these image data are suitable for super-resolution processing. In contrast, in the spatial frequency distribution of image data 2, the amount of high frequency component is smaller than that in the average spatial frequency distribution. This is because the image is unclear owing to camera shake, defocus, or the like. Image data 2 is not suitable for super-resolution processing. For this reason, image data 2 is deleted from a plurality of image data.

<6.2 Image Data Count Reduction Processing Based on Color Information>

Figure 11:
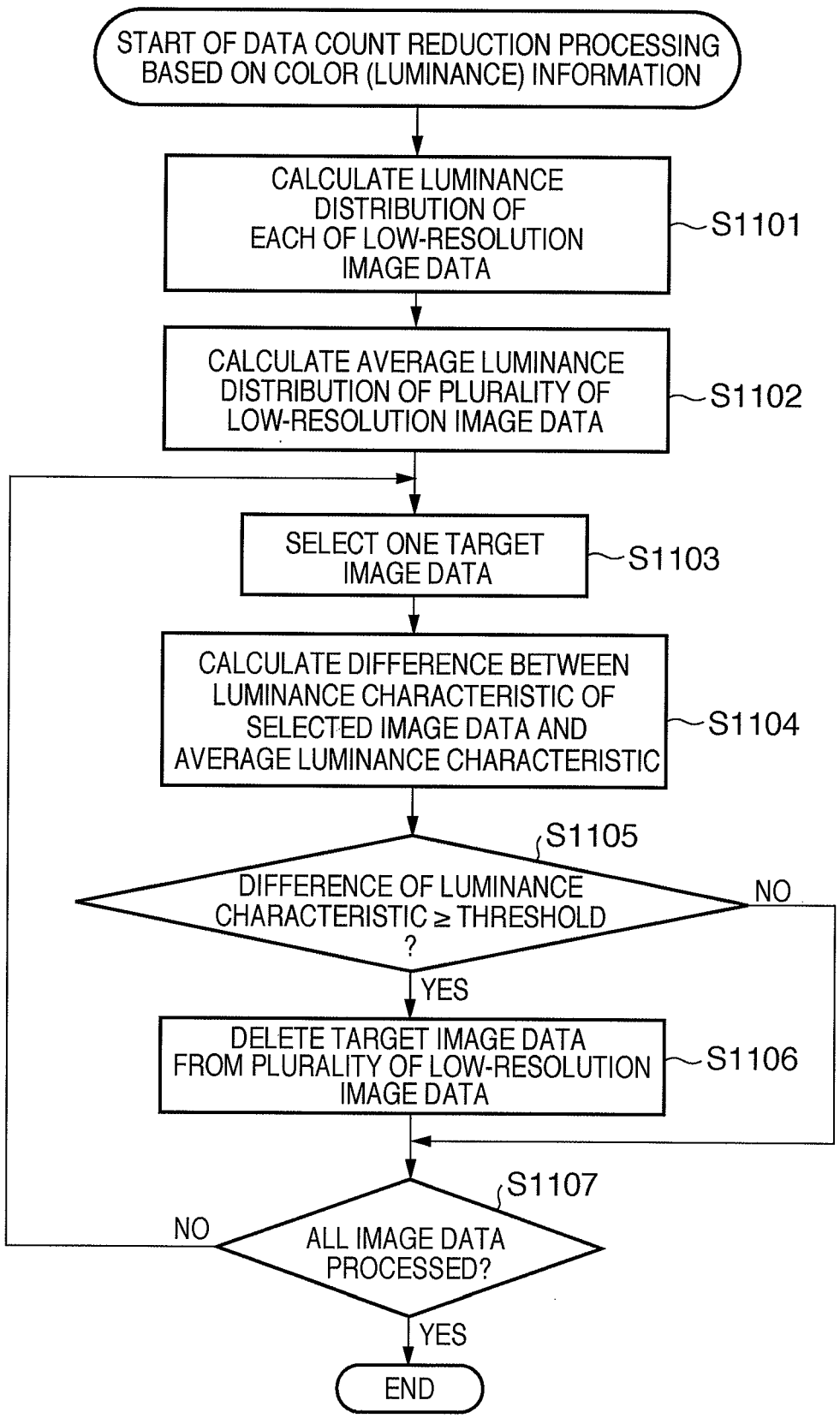
FIG. 11 is a flowchart showing the sequence of image data count reduction processing based on color information.

FIG. 11 is a flowchart showing the sequence of image data count reduction processing based on color information. In the first embodiment, the value of a luminance signal representing brightness is used as color information.

In step S1101, the image data count reduction unit 332 calculates the luminance distribution of each of low-resolution image data. In step S1102, the image data count reduction unit 332 calculates the average luminance distribution of the plurality of image data.

In step S1103, the image data count reduction unit 332 selects one target image data from the plurality of image data. In step S1104, the image data count reduction unit 332 calculates the difference between the luminance distribution of the target image data and the average luminance distribution calculated in step S1102.

In step S1105, the image data count reduction unit 332 determines whether the difference from the calculated luminance distribution is equal to or larger than a predetermined threshold. If the image data count reduction unit 332 determines that the difference is equal to or larger than the threshold (determines that the color characteristic is different), the process advances to step S1106. In step S1106, the image data count reduction unit 332 determines that the target image data has a characteristic different from those of the remaining image data, and deletes the target image data from the plurality of image data.

In step S1107, the image data count reduction unit 332 determines whether all the image data have been processed. If the image data count reduction unit 332 determines that unprocessed image data remains, the process returns to step S1103 to process the next image data as target image data.

If the image data count reduction unit 332 determines in step S1105 that the difference from the calculated luminance distribution is smaller than the threshold, it determines that the image data has a similar characteristic, and the process advances to step S1107 without deleting the target image data.

If the image data count reduction unit 332 determines in step S1107 that all the image data have been processed, it ends the image data count reduction processing based on color information.

Figure 12:
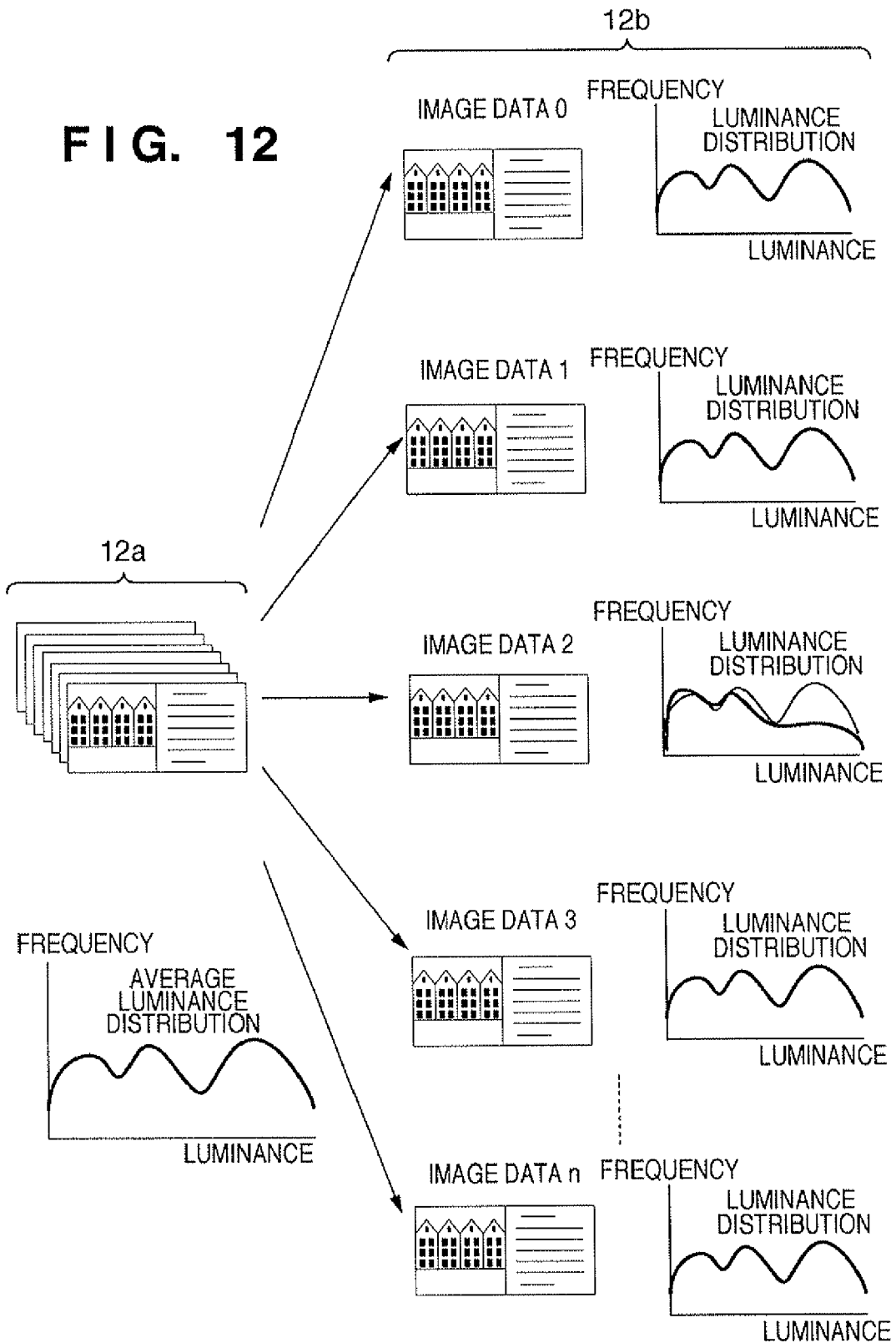
FIG. 12 is a view showing an example of the characteristic of the luminance distribution of each image data.

FIG. 12 is a view showing an example of the characteristic of the luminance distribution of each image data. In FIG. 12, 12a represents a plurality of image data and their average luminance distribution.

In FIG. 12, 12b represents respective image data (0 to n) and their luminance distributions. Each image data in super-resolution processing has a phase shift amount of one pixel or less. The luminance distribution of each image data is almost the same as the average luminance distribution represented in 12a of FIG. 12.

The luminance distributions of image data 0 to n except image data 1 in 12b of FIG. 12 are almost the same as the average luminance distribution, and these image data are suitable for super-resolution processing. In contrast, in the luminance distribution of image data 1, the bright region is smaller than that in the average luminance distribution.

This is because the image is dark owing to underexposure or an exposure adjustment error in camera shooting, an insufficient light quantity of the light source in scanning by a scanner, or the like. Image data 1 is not suitable for super-resolution processing. For this reason, image data 1 is deleted from the plurality of image data.

<6.3 Image Data Count Reduction Processing Based on Phase Shift Information>

Figure 13:
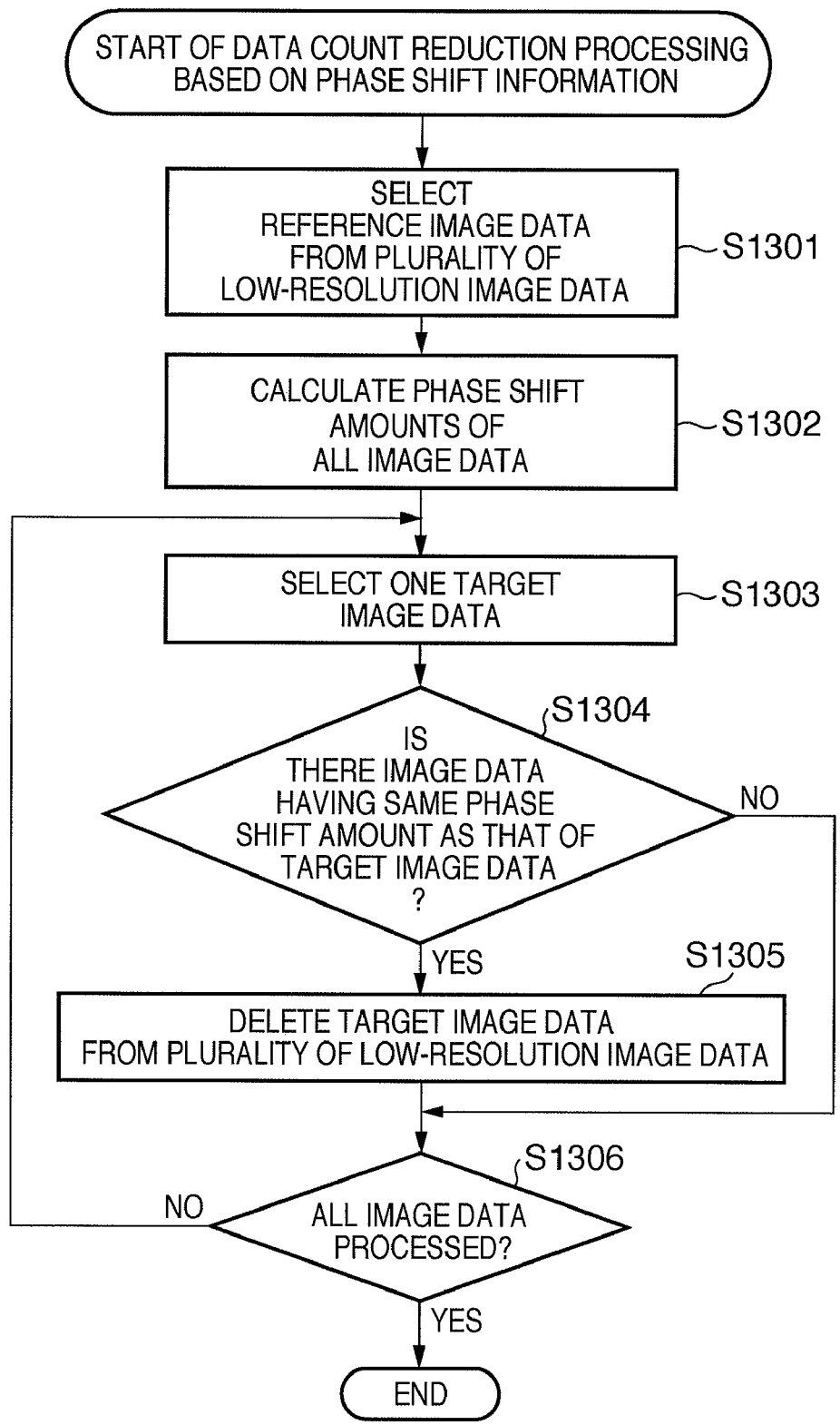
FIG. 13 is a flowchart showing the sequence of image data count reduction processing based on phase shift information.

FIG. 13 is a flowchart showing the sequence of image data count reduction processing based on phase shift information. Super-resolution processing executes interpolation processing for a phase shift amount of less than one pixel, generating high-resolution image data. Image data having the same phase are redundant, and thus deleted.

In step S1301, the image data count reduction unit 332 selects reference image data from a plurality of low-resolution image data. In step S1302, the image data count reduction unit 332 calculates the phase shift amount between the reference image data and each of the image data.

In step S1303, the image data count reduction unit 332 selects one target image data from the plurality of image data.

In step S1304, the image data count reduction unit 332 determines whether image data having the same phase shift amount as that of the target image data exists in the plurality of image data. If the image data count reduction unit 332 determines that image data having the same phase shift amount exists, the process advances to step S1305. In step S1305, the image data count reduction unit 332 determines that the target image data is redundant, and thus deletes it from the plurality of image data.

In step S1306, the image data count reduction unit 332 determines whether all the image data have been processed. If the image data count reduction unit 332 determines that unprocessed image data remains, the process returns to step S1303 to process the next image data as target image data.

If the image data count reduction unit 332 determines in step S1304 that the target image data has a different phase shift amount, the process advances to step S1306 without deleting the target image data.

If the image data count reduction unit 332 determines in step S1306 that all the image data have been processed, it ends the image data count reduction processing based on phase shift information.

As is apparent from the above description, the image forming apparatus according to the first embodiment executes image data count reduction processing to delete improper image data from a plurality of low-resolution image data used in super-resolution processing.

By deleting low-resolution image data improper for super-resolution processing, the image forming apparatus can generate high-quality, high-resolution image data while reducing the memory capacity.

Second Embodiment

In the first embodiment, the number of image data is reduced in accordance with image data count reduction processing in the image data count reduction unit regardless of the memory capacity of the image forming apparatus. However, the present invention is not limited to this. For example, image data count reduction processing may also be executed in consideration of the memory capacity of the image forming apparatus. Details of the second embodiment will be explained with reference to FIGS. 14 to 18.

Figure 14:
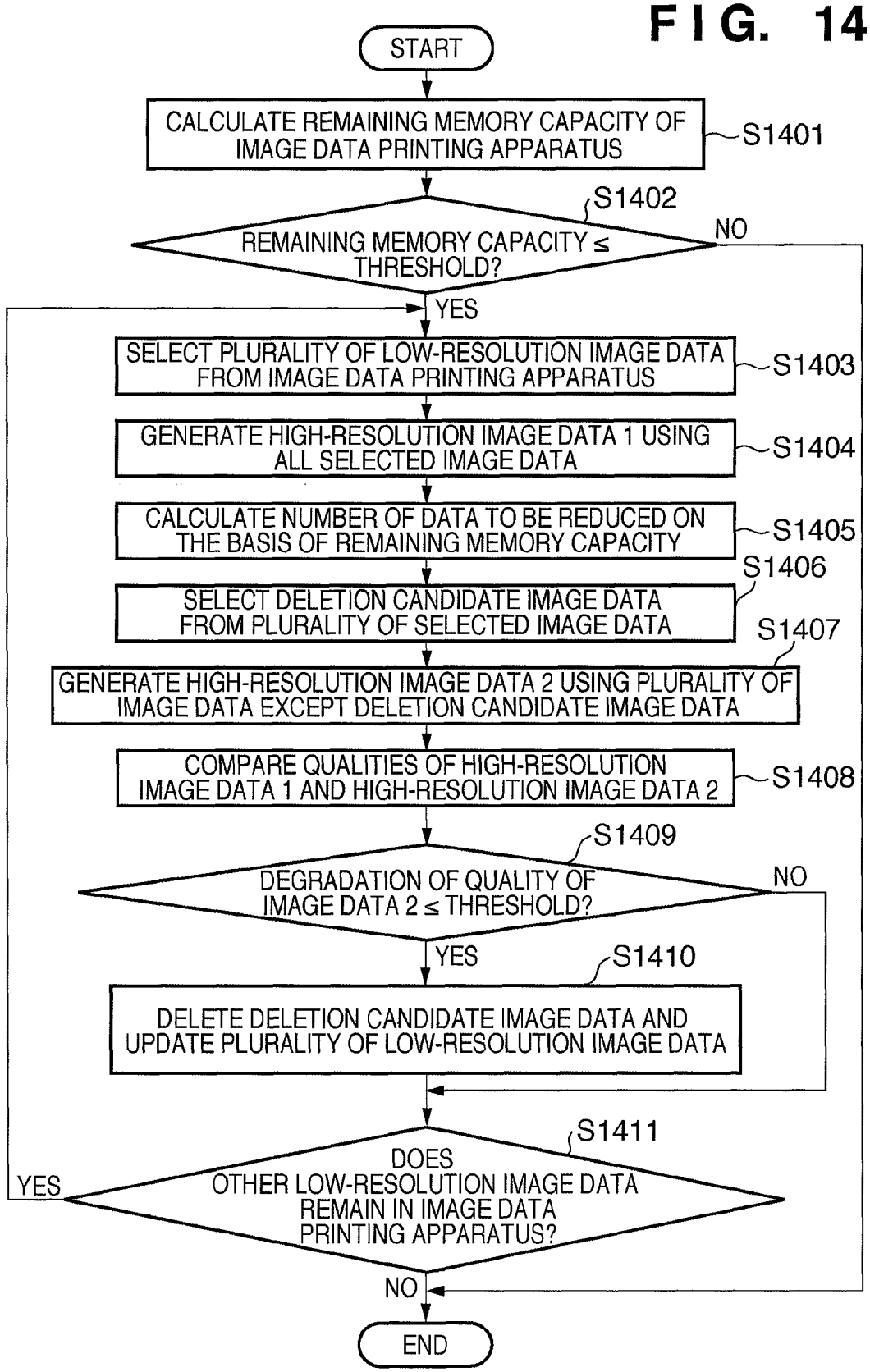
FIG. 14 is a flowchart showing the sequence of image data count reduction processing.

FIG. 14 is a flowchart showing the sequence of image data count reduction processing according to the second embodiment. In step S1401, the remaining memory capacity capable of recording image data in an HDD 304 serving as an image data recording device is calculated. In step S1402, it is determined whether the remaining memory capacity capable of recording image data is equal to or smaller than a predetermined threshold.

If it is determined in step S1402 that the remaining memory capacity is equal to or smaller than the threshold, the process advances to step S1403 to select a plurality of low-resolution image data used in super-resolution processing from image data stored in the HDD 304.

Figure 15:
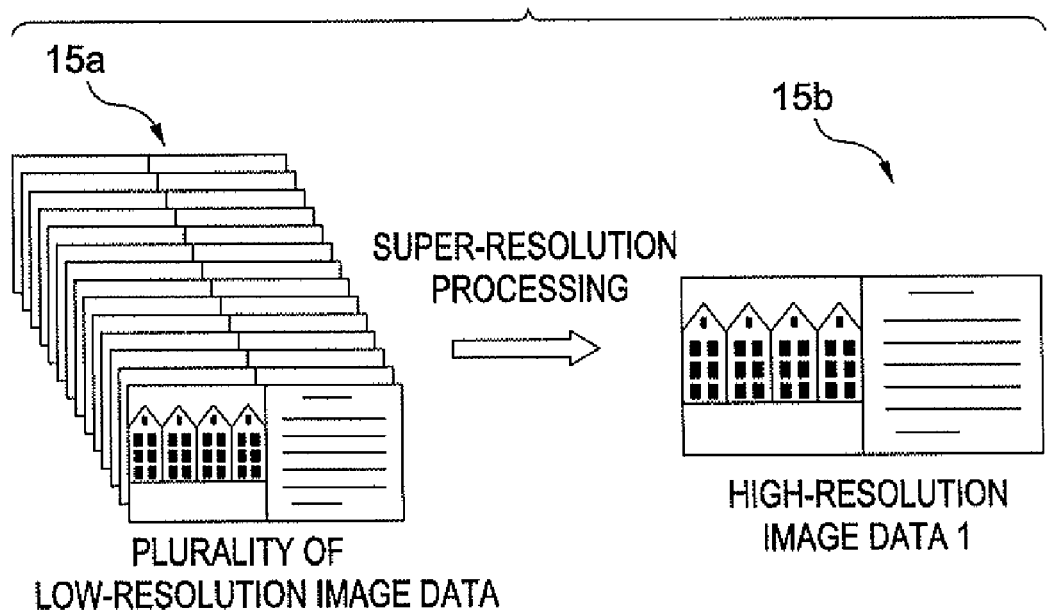
FIG. 15 is a view showing a state in which image data 1 is generated by performing super-resolution processing using all low-resolution image data.

In step S1404, super-resolution processing is executed using all the selected image data to generate image data 1 of target high resolution. FIG. 15 shows a state in which image data 1 is generated by performing super-resolution processing using all low-resolution image data.

In step S1405, the number of data (data reduction count) to be reduced is calculated based on the remaining memory capacity. In step S1406, deletion candidate image data are selected as deletion candidates from the plurality of selected image data in accordance with the calculated data reduction count.

Figure 16:
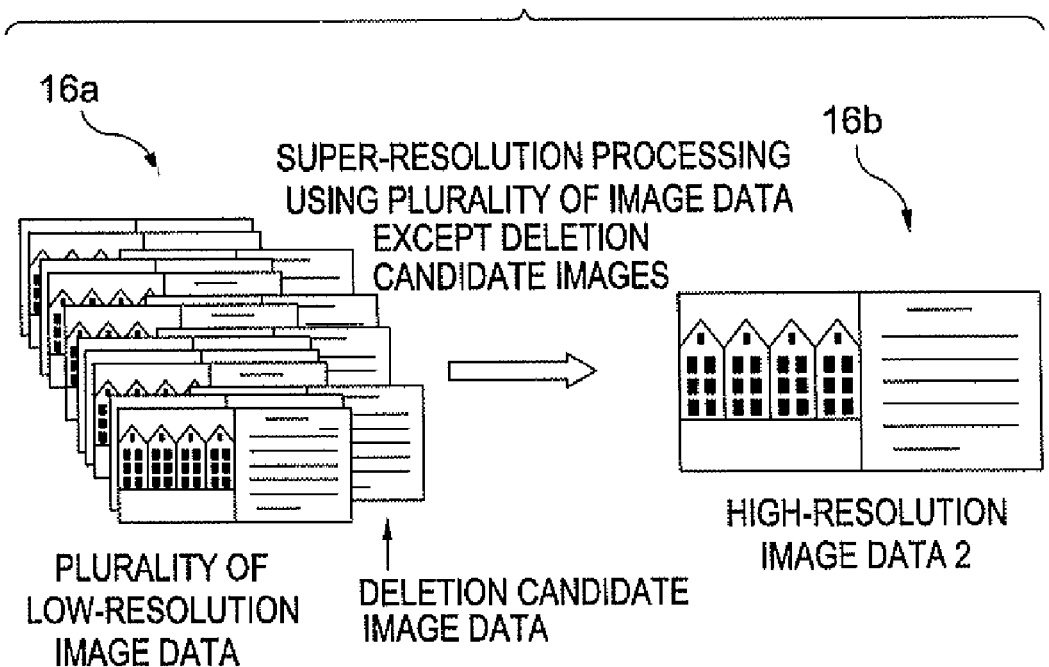
FIG. 16 is a view showing a state in which deletion candidate data are selected as deletion candidates from a plurality of selected image data, and also showing high-resolution image data 2 generated by performing super-resolution processing using image data which remain after deleting deletion candidate image data from the plurality of selected image data.

In FIG. 16, 16a represents a state in which deletion candidate data are selected as deletion candidates from a plurality of selected image data (grayout image data are deletion candidate data).

In step S1407, super-resolution processing is done using image data which remain after deleting the deletion candidate image data from the plurality of selected image data. As a result, image data 2 of target high resolution is generated.

In FIG. 16, 16b represents high-resolution image data 2 generated by performing super-resolution processing using image data which remain after deleting deletion candidate image data from a plurality of selected image data.

In step S1408, the quality of image data 1 generated in step S1404 and that of image data 2 generated in step S1407 are compared. In step S1409, it is determined whether degradation of the quality of image data 2 from that of image data 1 is equal to or smaller than a threshold.

If it is determined in step S1409 that degradation of the quality of image data 2 is equal to or smaller than the threshold, the process advances to step S1410 to delete the deletion candidate image data from the plurality of image data. Then, the remaining image data are stored in the HDD 304 to update the plurality of image data, and the process advances to step S1412.

If it is determined in step S1409 that degradation of the quality of image data 2 exceeds the threshold, the process advances to step S1411 without deleting the deletion candidate image data.

In step S1411, it is determined whether other low-resolution image data (other low-resolution image data used in super-resolution processing) not selected in step S1403 remain in the HDD 304. If it is determined in step S1411 that other low-resolution image data remain, the process returns to step S1403.

If it is determined in step S1411 that no other low-resolution image data remains, the image data count reduction processing ends.

The comparison between image data 1 and image data 2 in step S1408 is achieved by comparing the spatial frequency distribution (FIG. 17) of image data 1 and the spatial frequency distribution (FIG. 18) of image data 2.

Figure 17:
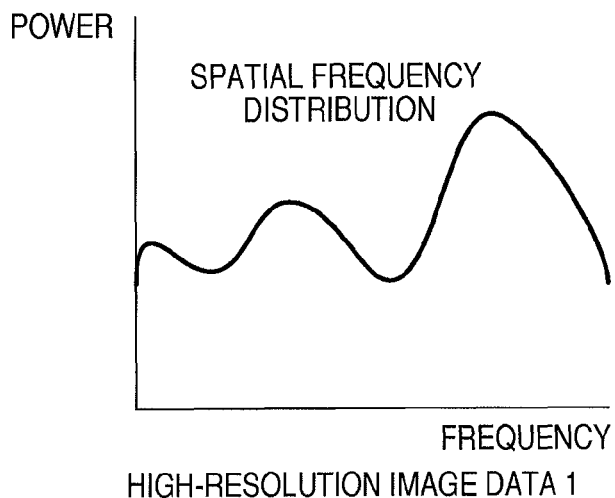
FIG. 17 is a graph showing an example of the spatial frequency distribution of image data 1.
Figure 18:
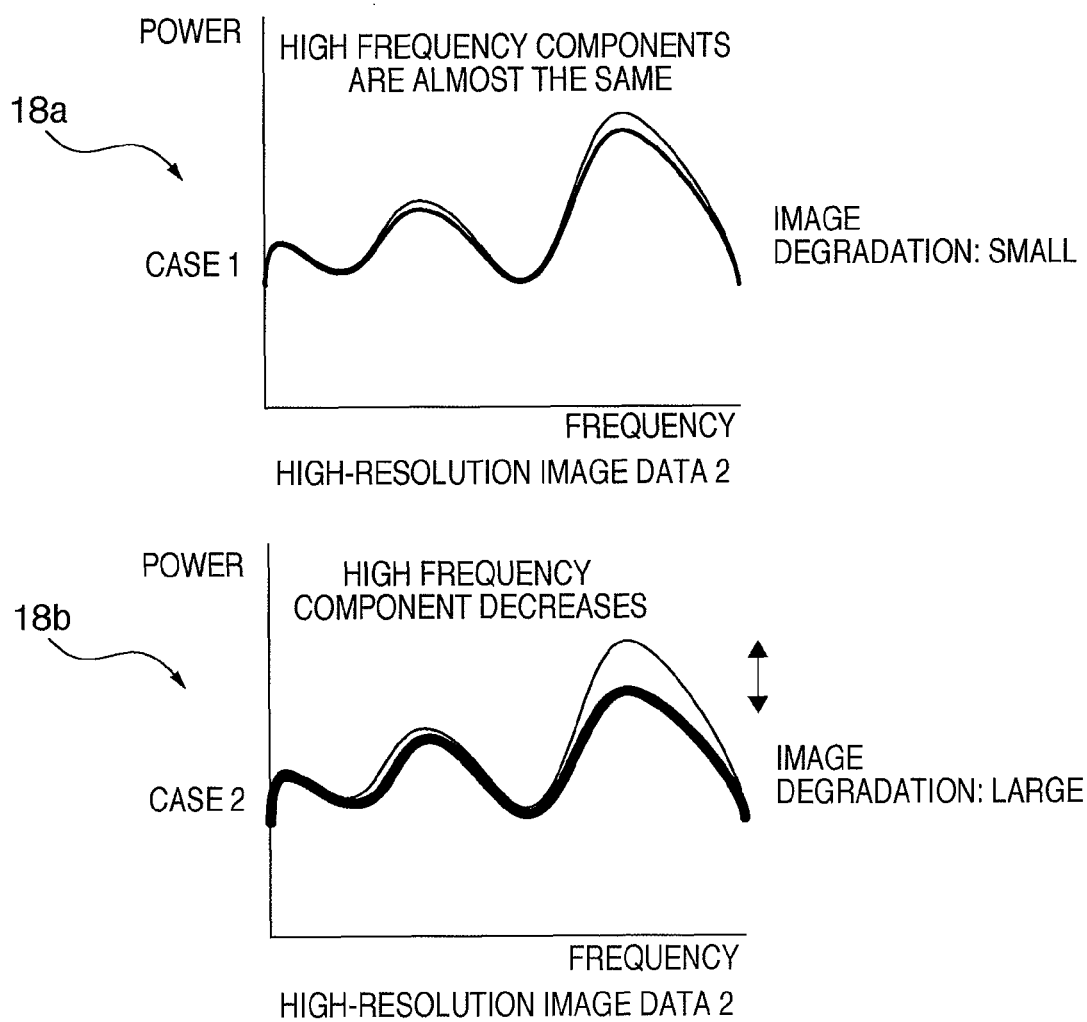
FIG. 18 is a graph showing an example of the spatial frequency distribution of image data 2.

FIG. 17 shows an example of the spatial frequency distribution of image data 1. FIG. 18 shows an example of the spatial frequency distribution of image data 2. 18a in FIG. 18 represents an example of image data 2 when degradation of the image quality is small, and 18b in FIG. 18 represents an example of image data 2 when degradation of the image quality is large.

In determination of the image quality degradation in step S1409, when image data 2 has the spatial frequency distribution represented by 18a of FIG. 18, it is determined that degradation of the image quality is small. This is because the spatial frequency components of image data 1 and image data 2 are almost the same, and it can be determined that image data 2 generates almost the same high-resolution image data as that of image data 1.

When image data 2 has the spatial frequency distribution represented by 18b of FIG. 18, it is determined that degradation of the image quality is large. This is because the amount of high frequency component in the spatial frequency distribution of image data 2 is smaller than that in the spatial frequency distribution of image data 1, and image data 2 generates lower-resolution image data than that of image data 1.

As is apparent from the above description, according to the second embodiment, when the remaining memory capacity becomes equal to or smaller than a threshold, low-resolution image data serving as a deletion candidate is deleted from a plurality of low-resolution image data. Hence, the image forming apparatus can always ensure a predetermined remaining memory capacity.

In the second embodiment, when deleting low-resolution image data serving as a deletion candidate, degradation of the quality of high-resolution image data obtained when performing super-resolution processing for low-resolution image data except the image data serving as a deletion candidate is checked. Then, the image data serving as a deletion candidate is deleted.

Thus, even when low-resolution image data is deleted to ensure the remaining memory capacity, high-resolution image data having desired image quality can be generated.

In the above description, the timing to execute image data count reduction processing has not been particularly mentioned. For example, the image data count reduction processing may also be done for a plurality of low-resolution image data stored in the HDD 304 after performing image data count reduction processing described in the first embodiment. Alternatively, the image data count reduction processing may also be done for a plurality of low-resolution image data stored in the HDD 304 before performing image data count reduction processing described in the first embodiment.

Third Embodiment

In the second embodiment, if it is determined in step S1409 that degradation of the quality of image data 2 exceeds the threshold, the process advances to step S1411 without deleting deletion candidate image data. However, the present invention is not limited to this.

For example, super-resolution processing is executed to generate high-resolution image data and hold it in an HDD 304. In addition, a plurality of low-resolution image data used to generate the high-resolution image data are deleted to ensure a sufficient remaining memory capacity.

Figure 19:
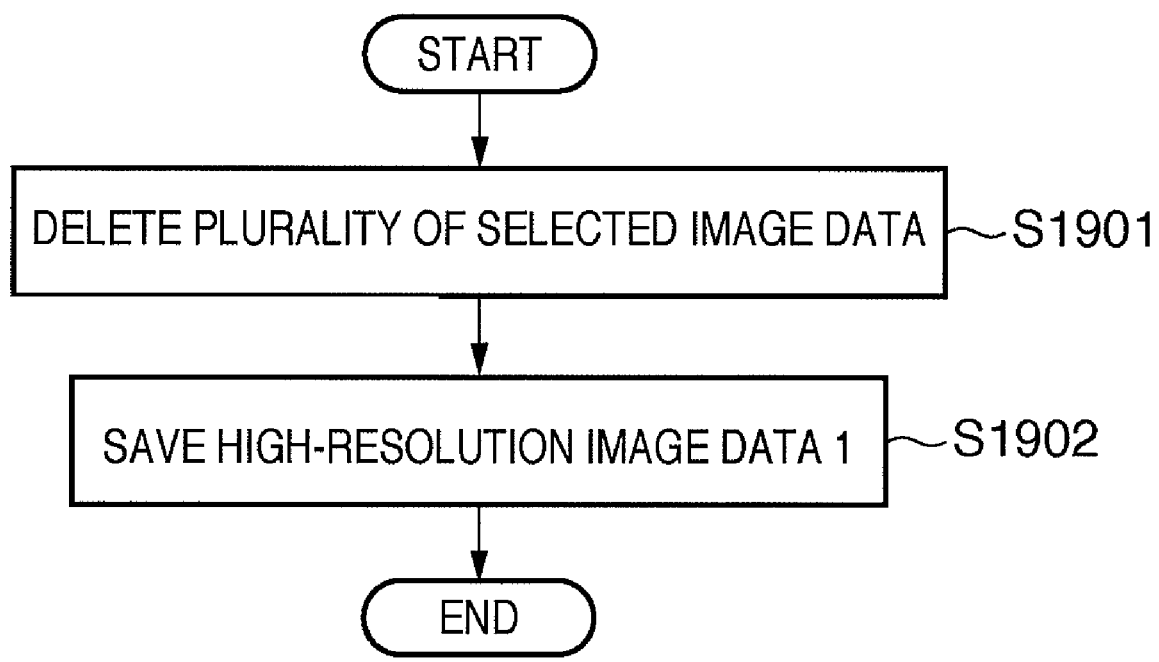
FIG. 19 is a flowchart showing the sequence of processing executed when it is determined in step S1409 of FIG. 14 that degradation of the quality of image data 2 exceeds a threshold.

FIG. 19 is a flowchart showing the sequence of processing executed when it is determined in step S1409 that degradation of the quality of image data 2 exceeds the threshold.

In step S1901, a plurality of image data selected in step S1403 of FIG. 14 are deleted from the HDD 304. In step S1902, image data 1 generated in step S1404 of FIG. 14 is stored in the HDD 304.

According to the third embodiment, a plurality of selected image data are deleted in this manner, reliably ensuring a sufficient memory capacity.

Other Embodiments

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a storage medium which stores software program codes for implementing the functions of the above-described embodiments to a system or apparatus. In this case, these functions are implemented by reading out and executing the program codes stored in the storage medium by the computer (or the CPU or MPU) of the system or apparatus. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case wherein the functions of the above-described embodiments are implemented when the computer executes the readout program codes. Also, the present invention includes a case wherein an OS (Operating System) or the like running on the computer performs some or all of actual processes on the basis of the instructions of the program codes and thereby implements the functions of the above-described embodiments.

Furthermore, the present invention includes a case wherein the functions of the above-described embodiments are implemented after the program codes read out from the storage medium are written in the memory of a function expansion board inserted into the computer or the memory of a function expansion unit connected to the computer. That is, the present invention also includes a case wherein after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-109543, filed Apr. 18, 2008, which is hereby incorporated by reference herein in its entirety.

What is claimed is:

1. An image forming apparatus which executes super-resolution processing using a plurality of image data having a first resolution and different phase shifts in a lateral or longitudinal direction to generate image data having a second resolution higher than the first resolution, the apparatus comprising:
    an acquisition unit configured to acquire a plurality of image data having the first resolution;
    a selection unit configured to select image data to be deleted from the plurality of image data acquired by said acquisition unit on the basis of one of spatial frequency information and color information of each image data, wherein said selection unit selects, as the image data to be deleted, image data having a spatial frequency characteristic different from a reference spatial frequency characteristic among the plurality of image data acquired by said acquisition unit;
    a deletion unit configured to delete the image data selected by said selection unit from the plurality of image data acquired by said acquisition unit; and
    a storage unit configured to store, as image data used in the super-resolution processing, remaining image data which are not deleted by said deletion unit among the plurality of image data acquired by said acquisition unit.

2. The apparatus according to claim 1, further comprising a determination unit configured to determine whether image data obtained when executing the super-resolution processing using image data except image data selected by said selection unit among the plurality of image data acquired by said acquisition unit has a predetermined image quality,
    wherein when said determination unit determines that the image data has the predetermined image quality, said deletion unit deletes the image data selected by said selection unit.

3. The apparatus according to claim 2, further comprising an execution unit configured to execute the super-resolution processing using the plurality of image data acquired by said acquisition unit when said determination unit determines that the image data does not have the predetermined image quality,
    wherein when said execution unit executes the super-resolution processing, said deletion unit deletes the plurality of image data used in the super-resolution processing, and
    said storage unit stores image data generated by executing the super-resolution processing.

4. An image forming method being for application to an image forming apparatus which executes super-resolution processing using a plurality of image data having a first resolution and different phase shifts in a lateral or longitudinal direction to generate image data having a second resolution higher than the first resolution, the method comprising:
    an acquisition step of acquiring a plurality of image data having the first resolution;
    a selection step of selecting image data to be deleted from the plurality of image data acquired in the acquisition step on the basis of spatial frequency information or color information of each image data, wherein said selection step selects, as the image data to be deleted, image data having a spatial frequency characteristic different from a reference spatial frequency characteristic among the plurality of image data acquired by said acquisition step;
    a deletion step of deleting the image data selected in the selection step from the plurality of image data acquired in the acquisition step; and
    a storage step of storing, as image data used in the super-resolution processing, remaining image data which are not deleted in the deletion step among the plurality of image data acquired in the acquisition step.

5. A non-transitory computer-readable storage medium storing a program which causes a computer to perform or instruct the performing of the image forming method being for application to an image forming apparatus which executes super-resolution processing using a plurality of image data having a first resolution and different phase shifts in a lateral or longitudinal direction to generate image data having a second resolution higher than the first resolution, the program causing the computer to execute
    an acquisition step of acquiring a plurality of image data having the first resolution,
    a selection step of selecting image data to be deleted from the plurality of image data acquired in the acquisition step on the basis of spatial frequency information or color information of each image data, wherein said selection step selects, as the image data to be deleted, image data having a spatial frequency characteristic different from a reference spatial frequency characteristic among the plurality of image data acquired by said acquisition step,
    a deletion step of deleting the image data selected in the selection step from the plurality of image data acquired in the acquisition step, and
    a storage step of storing, as image data used in the super-resolution processing, remaining image data which are not deleted in the deletion step among the plurality of image data acquired in the acquisition step.

* * * * *